Patented Feb. 16, 1926.

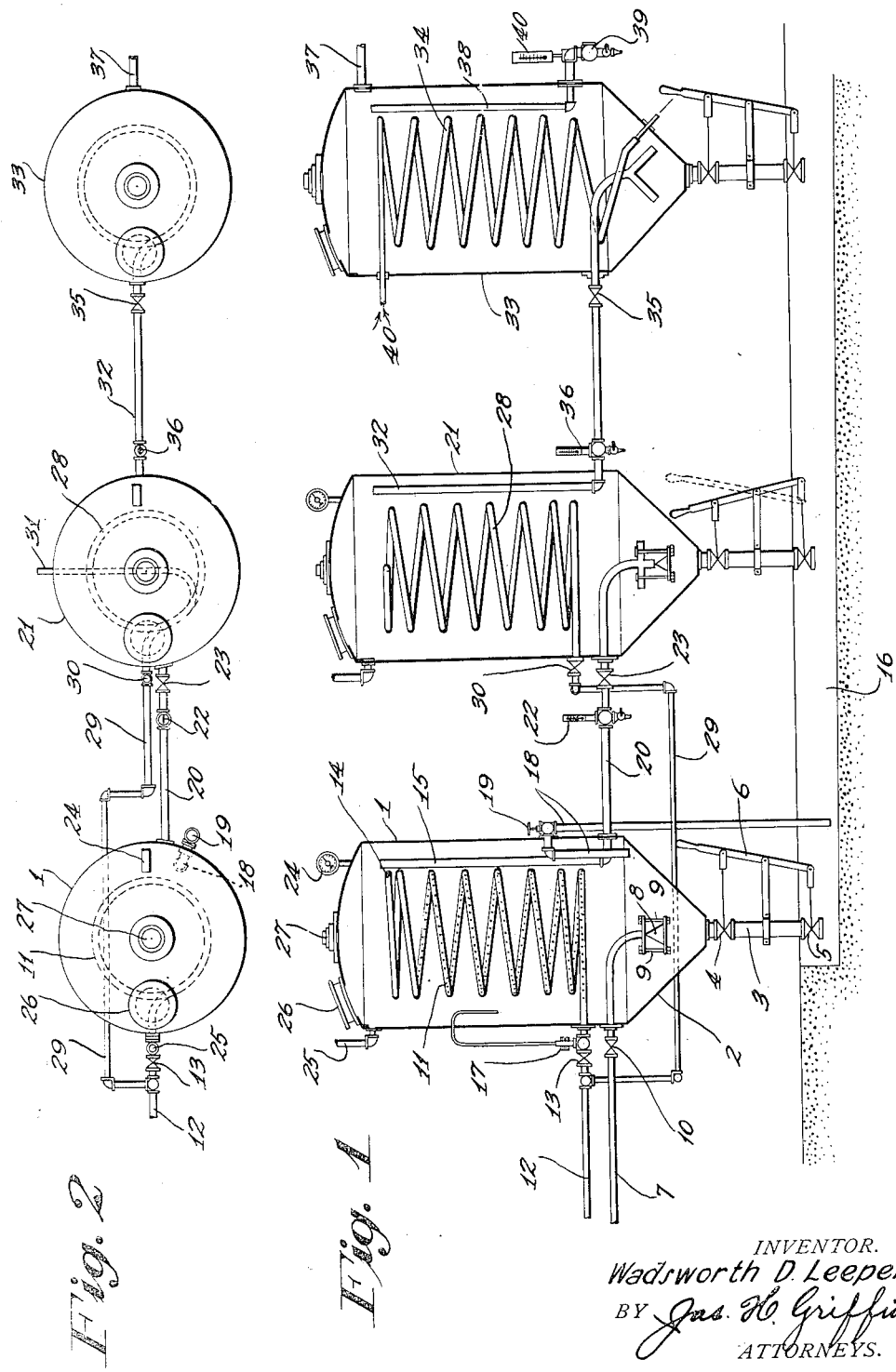

1,573,321

UNITED STATES PATENT OFFICE.

WADSWORTH D. LEEPER, OF NEW YORK, N. Y., ASSIGNOR TO AMERICAN DEMULSIFYING COMPANY, OF MUSKOGEE, OKLAHOMA, A CORPORATION OF OKLAHOMA.

CONTINUOUS PROCESS OF DEMULSIFYING MINERAL OILS.

Application filed December 7, 1921. Serial No. 520,579.

*To all whom it may concern:*

Be it known that I, WADSWORTH D. LEEPER, a citizen of the United States, residing at New York city, in the county and State of New York, have invented a certain new and useful Continuous Process of Demulsifying Mineral Oils, of which the following is a specification.

This invention is a process of demulsifying mineral oils, its object being to remove the water or aqueous constituents from the oil, and, also, various other impurities, mechanical and otherwise, in order to condition the oils for subsequent refining processes, or for transmission through pipe lines. The process is simple, efficient, and economical to operate.

Speaking generally, the specific treatment to which the oil is subjected consists, preferably, in injecting it into a body of hot water confined within a suitable tank, whereby the oil and impurities which it carries are thoroughly disintegrated or broken up, thereby freeing the more solid impurities from the oil and causing them to settle or precipitate near the bottom of the tank, from which they may be drawn off as occasion requires. Thereafter the oil is subjected to the action of live steam, which thoroughly breaks up the oil into globules and commingles therewith, thereby facilitating the separation of the water carried by the oil.

The oil floats, continuously, towards the top of said tank, from which it flows off, by gravity, into the bottom of a second tank in which it is subjected to indirect heat, by means of closed steam coils, whereby substantially all the water is eliminated from the oil. The separated water settles to the bottom of the tank and the oil rises to the top, whereupon it flows off by gravity, substantially dehydrated, and may thereafter be further refined, as is customary, or allowed to flow into the pipe line. However, it is preferred to allow the oil to flow from the second tank into the bottom of a third tank wherein it is subjected to a refrigerating or cooling process, effected by passing cold water through closed coils positioned within the tank, which cooling process has the effect of condensing out or precipating any traces of residual water which the oil may carry, and, further, reducing the temperature of the oil. From this third tank, the oil is delivered to storage tanks.

Features of the invention, other than those adverted to, will be apparent from the hereinafter detailed description, read in conjunction with the accompanying drawings, which illustrate one, and the preferred type, of an apparatus which has proved particularly efficient in practicing applicant's process. It will be understood, however, that the process may be practiced in other types of apparatus.

Figure 1 is a diagrammatic showing of an apparatus embodying the present invention illustrating the tanks therof in central section; and, Figure 2 is a plan view of the apparatus shown in Figure 1.

Referring to the drawings, 1 designates a tank shown as cylindrical and positioned vertically and provided with a tapering bottom 2 having an outlet drain 3 controlled by two valves 4 and 5, which may be operated simultaneously by a handle 6, so as to close the valve 4 when the valve 5 is opened and vice versa.

Oil from any suitable source is introduced into the tank through a pipe 7 which enters the tank near its bottom and is provided at its open end with a regulating cone 8, which may be adjusted by means of bolts 9. The cone 8 is coaxial with the outlet end of the pipe 7 so that the oil upon leaving the pipe 7 flows down over the surface of the cone 8. By adjusting the bolts 9, the flow of oil may be governed so as to control the thickness of the film flowing down over the cone.

In practice, I preferably so adjust the parts in accordance with the particular oil under treatment that the said film of oil will be relatively thin and thereby enable it to be treated with maximum efficiency. A valve 10 is preferably included in the pipe 7 exteriorly of the tank, so as to enable the oil to be completely shut off when desired.

Positioned within the upper portion of the tank is a coil 11 to which steam is fed from the pipe 12 having a valve 13 therein for manually controlling the supply of steam. The coil 11 is perforated for the greater portion of its length, but the last few uppermost convolutions are preferably imperforate. The upper end of the coil is substantially closed, but is provided with a small vent hole 14. When the apparatus is in operation, oil is fed into the tank 1 through the pipe 7, while live steam is fed into the tank through the perforations of the coil 11. The oil level in the tank rises to the top of an overflow pipe 15, so that the steam from the coil 11 is discharged directly into the oil and thoroughly breaks up the oil into globules with which it commingles. As this steam condenses, the water of condensation and the oil in the tank stratify, the oil rising to the top and the water settling to the bottom. During the settling of this water, it carries with it impurities which are deposited in the bottom of the tank and which may be removed from time to time through the operation of the valves 4 and 5 and allowed to flow into a drain gutter 16. The temperature in the tank may be controlled through the regulation of the admission of live steam through the employment of a thermostatic regulator 17.

In the normal operation of the apparatus, the oil flowing into the tank through the pipe 7 is injected directly into the body of hot water at the base of the tank and the oil and impurities which it carries are thoroughly disintegrated or broken up, so that the more solid impurities are freed from the oil and caused to settle to the bottom of the tank.

The oil purified to this extent rises by virtue of its specific gravity through the water and into the zone of the coil 11 where it is subjected to live steam which thoroughly breaks up the oil into globules and commingles therewith, thereby facilitating the separation of the water carried by the oil. This water through the stratification described settles to the bottom of the tank. The accumulation of too much water in the tank is obviated by the employment of a siphon overflow 18 which may be controlled by a valve 19 and which serves to discharge excess water into the drain gutter 16.

As the oil rises in the tank 1, this treatment with live steam continues until any particular portion of the oil has risen above the perforated portion of the coil 11, whereupon the oil assumes a quiescent state about the imperforate portion of the coil and overflows through the overflow pipe 15 and through a pipe 20 into a second tank 21. The pipe 20 preferably has associated therewith a thermometer 22 and is valved as at 23, so that the flow of oil into the tank 21 may be shut off if desired.

The tank 1 is preferably provided with a pressure indicator 24, a pressure relief valve 25 and a man-hole 26, through which man-hole access may be had to the interior of the tank. It is found in practice that during the treatment of the oil interiorly of the tank, certain of the lighter hydrocarbons are volatilized and if desired the resulting gases or vapors may be drawn off through a pipe associated with an outlet nipple 27 and may be condensed for the recovery of gasoline or other light hydrocarbons. However, I prefer to normally seal the outlet nipple 27 and pass the vapors out through the overflow pipe 15 for subsequent treatment.

In the manner described, the oil in the tank 1 flows continuously toward and through the overflow pipe 15 into the tank 21 wherein it is subjected to the indirect heat of steam flowing through a closed coil 28. This steam is supplied through a pipe 29, which is a branch of the pipe 12 and is valved at 30, so that the flow of steam into the coil 28 may be controlled. This coil is imperforate and simply leads vertically through the tank and out near the top of the same by way of the pipe 31, as shown in Figure 2.

During its passage through the tank 21, the water which may have been carried along with the oil from the tank 1, stratifies out, so that the oil is substantially dehydrated by the time it flows through the overflow pipe 32. The water which accumulates in the bottom of the tank 21 together with entrained impurities, may be discharged from the tank 21 into the drain gutter 16 by means of the drain mechanism substantially the same as that associated with the tank 1. The tank 21 preferably has associated therewith a pressure gauge, a pressure relief valve, a manhole and an outlet nipple in the same manner as the tank 1 and the outlet nipple of the tank 21 may be employed or not as desired for the carrying off of gas or vapors.

The oil flowing out through the overflow pipe 32 may be thereafter further refined in any well known manner or may flow directly into a storage tank. However, I prefer to pass the oil from the tank 21 through the pipe 32 into a refrigerating or cooling tank 33, provided therein with a cooling coil 34, through which cold water can be passed.

The flow of oil into this tank through the pipe 21 may be controlled by a valve 35 and said pipe further has associated therewith a thermometer 36. The lower portion of the tank 33 is provided with draw-off valves, similar to the tanks 1 and 21, so that water or impurities which may settle at the bottom of the tank 33 may be drawn off into the drain gutter 16. In this last refrigerating tank any of the water which may have been carried along with the oil thus far through the drains will be entirely eliminated.

The tank 33 may have associated therewith a man-hole and an outlet nipple corresponding to like parts in the tanks 1 and 21 and having the same functions.

Oil is discharged from the tank 33 by gravity through a pipe 37 and may be delivered therefrom to storage tanks or otherwise distributed as desired.

Samples of the product may be drawn from the third tank 33 through a pipe 38 provided with a draw-off valve 39 and having associated therewith a thermometer 40.

An important feature of the present invention resides in the fact that the process is in every respect a continuous one and that it is not only adapted to operate upon oils which are fed thereto with a relatively low percentage of water content or no water at all, but also upon oils which have relatively high percentages of water content. In fact, the water content of the oil entering the apparatus in nowise whatever effects the ultimate result of purifying the oil. Great difficulty has been heretofore experienced in purifying oils having a relatively high percentage of water content, but the apparatus shown in the drawings will operate upon oils of this character, as well as oils which are practically free from water. During the passage of oil through the apparatus, it will be dehydrated, and will issue therefrom substantially free from aqueous content.

As stated, the apparatus is continuous in its operation. The oil is fed into the tank 1 through the pipe 7 under relatively low pressure, which may be hydrostatic or otherwise and this pressure need be only sufficient to bring about a constant flow of the oil. The pipe 7 may in practice be of relatively large size, as the water and oil rapidly stratify and it will of course be understood that the overflow pipe 15, as well as the other pipes of the apparatus which convey the oil after it leaves the tank 1 are of correspondingly large size, so that oil may be treated in large quantities and in a practical and expeditious manner. The live steam introduced into the tank 1 by way of the perforate coil 11 is under sufficient pressure to preclude the flow of the oil through the perforations into the interior of the coil and while this steam may be at different temperatures, I find that a good working temperature is somewhat between 150 and 200 degrees Fahrenheit. I recommend however that in tank 1 the water be at all times kept below the boiling point in order that the oil will not be unduly agitated, but will be permitted to stratify efficiently and advantageously. In tank 21, a good operating temperature has been found to be from 100 to 150 degrees Fahrenheit, depending on the character of the oil being treated.

I have hereinbefore set forth that the siphon 18 controls the water level in the tank 1 and this control is effected by means of the valve 19, which is preferably manually operable. In practice, the tank 1, as well as all other tanks, may be equipped with transparent sight gauges, so that the attendant or operator may keep track of the liquid levels. The sight gauge of the tank 1 (not shown), will enable the operator to ascertain the line of stratification between the water and oil in said tank and by manipulating the valve 19 can so control the flow through the siphon 18 as to maintain the water level substantially constant. For example, if the run of oil delivered through the pipe 7 has at any particular time, say fifty per cent water content, the operator may adjust the valve 19 to so govern the overflow through the siphon 18 that substantially the same amount of water will pass through the siphon as is delivered through the pipe 7 with the oil. There is, of course, water of condensation from the steam of the coil 11 and this water of condensation is taken into consideration in adjusting the valve 19, so that the overflow of water will be substantially equal to the water produced in the tank and the water level in said tank thereby maintained constant.

Having thus fully described the invention, what I claim as new and desire to secure by Letter Patent is:

1. The herein described process of demulsifying mineral oils which consists in injecting oil into a body of hot water below the surface thereof, for the purpose of disintegrating or breaking up said oil, whereby the oil and water stratify and the impurities settle, and subjecting the stratified oil to the action of live steam which thoroughly breaks up the oil into globules and commingles therewith, thereby facilitating the separation of any water which may be carried by the oil.

2. The herein described process of demulsifying mineral oils which consists in maintaining a body of hot water in the bottom of a receptacle, introducing oil into the receptacle below the surface of the water, so that it is caused to rise through the water and form a pool above the surface thereof and introducing live steam into the pool of oil above the surface of the water for the purpose of facilitating the separation from the oil of such water as may be entrained therein.

3. The herein described process of demulsifying mineral oils which consists in maintaining a body of hot water in the bottom of a receptacle, introducing oil into the receptacle below the surface of the water, so that it is caused to rise through the water and form a pool above the surface thereof and introducing live steam into the pool of oil above the surface of the water for the purpose of facilitating the separation from the oil of such water as may be entrained therein, and thereafter subjecting the thus dehydrated oil to the action of indirect heat for the purpose of further dehydrating the oil.

4. The herein described process of demulsifying mineral oils which consists in maintaining a body of hot water in the bottom of a receptacle, introducing oil into the receptacle below the surface of the water, so that it is caused to rise through the water and form a pool above the surface thereof and introducing live steam into the pool of oil above the surface of the water for the purpose of facilitating the separation from the oil of such water as may be entrained therein, and thereafter subjecting the thus dehydrated oil to the action of indirect heat for the purpose of further dehydrating the oil, and then cooling the oil.

5. The herein described process of demulsifying mineral oils which consists in injecting the oil to be treated into a body of water and below the surface thereof, subjecting the oil which rises through the water to a point above the surface thereof to live steam to effect at least a partial dehydration of the oil and subjecting the resulting product to indirect heat to further dehydrate the same.

6. The herein described process of demulsifying mineral oils which consists in injecting the oil to be treated into a body of water and below the surface thereof, subjecting the oil which rises through the water to a point above the surface thereof to live steam to effect at least a partial dehydration of the oil and subjecting the resulting product to indirect heat to further dehydrate the same, and then cooling the thus dehydrated oil.

7. The herein described process of demulsifying mineral oils which consists in causing oil to continuously flow through a plurality of receptacles in which it is forced to pass consecutively through a body of water, then live steam and then an indirect heat for the purpose of eliminating impurities and dehydrating the oil.

8. The herein described process of demulsifying mineral oils which consists in subjecting continuously flowing oil to the action of hot water, and thereafter to the action of live steam.

9. The herein described process of demulsifying mineral oils which consists in subjecting continuously flowing oil to the action of hot water, then to the action of live steam, and then to indirect heat.

10. The herein described process of demulsifying mineral oils which consists in first washing the oil by passing it through hot water while the oil is in a finely divided state and then passing live steam through the oil thus washed.

11. The herein described process of demulsifying mineral oils which consists in first washing the oil by passing it through hot water while the oil is in a finely divided state, then passing live steam through the oil thus washed for the purpose of at least partially dehydrating the same and then subjecting the resulting oil to an indirect heat for the purpose of further dehydrating the same.

In testimony whereof I have signed the foregoing specification.

WADSWORTH D. LEEPER.